(12) United States Patent
Nerone (10) Patent No.: US 8,866,403 B2
(45) Date of Patent: Oct. 21, 2014

(54) 3-WAY, PHASE-CUT DIMMABLE LED DRIVER

(75) Inventor: Louis Robert Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 986 days.

(21) Appl. No.: 12/963,882

(22) Filed: Dec. 9, 2010

(65) Prior Publication Data

US 2012/0146538 A1 Jun. 14, 2012

(51) Int. Cl.
*H05B 37/02* (2006.01)
*H05B 33/08* (2006.01)

(52) U.S. Cl.
CPC ........ *H05B 33/0815* (2013.01); *H05B 33/0848* (2013.01); *Y02B 20/346* (2013.01)
USPC ............ 315/291; 315/244; 315/247; 315/307

(58) Field of Classification Search
CPC ............... H05B 33/0815; H05B 37/02; H05B 33/0842; H05B 33/0848; H05B 33/0839; H05B 33/0881; Y02B 20/346
USPC .......................... 315/291, 244, 247, 307, 308
See application file for complete search history.

(56) References Cited

U.S. PATENT DOCUMENTS

| 5,559,395 A * | 9/1996 | Venkitasubrahmanian et al. ............................. 315/247 |
| 6,373,200 B1 * | 4/2002 | Nerone et al. ................ 315/291 |
| 8,049,432 B2 * | 11/2011 | Taipale et al. ................. 315/282 |
| 8,294,379 B2 * | 10/2012 | Liu et al. ....................... 315/224 |
| 8,497,636 B2 * | 7/2013 | Nerone .......................... 315/210 |
| 2010/0060186 A1 * | 3/2010 | Taipale et al. ................. 315/291 |
| 2011/0193490 A1 * | 8/2011 | Kumar .......................... 315/246 |

OTHER PUBLICATIONS

"Transition-mode PFC controller", L6562, from STmicroelectronics, Nov. 2005, pp. 1-16.

* cited by examiner

*Primary Examiner* — Jimmy Vu
*Assistant Examiner* — Amy Yang
(74) *Attorney, Agent, or Firm* — Fay Sharpe LLP (57) ABSTRACT

An LED driver is presented with a sensing circuit and attenuator circuits to provide three-way switched dimming as well as phase-cut dimming to control the output power driving an LED load allowing installation into conventional three-way switched lamp sockets or in sockets wired to a wall or table mounted phase-cutting dimmer control. When installed in a three way socket, the circuit senses the position of the three way switch and changes the lamp current accordingly. The lamp can also be dimmed by a table-top dimmer or a wall dimmer (in a three-way socket or in a conventional dual contact socket) by applying a phase-cut power input, with the driver circuit including circuitry to sense the average value of a phase-cut power line to adjust lamp current.

21 Claims, 5 Drawing Sheets

| | | | | MULT | COMP |
|---|---|---|---|---|---|
| 410 | OFF | NO POWER APPLIED | 101 S R E | OFF | OFF |
| 420 | LOW | POWER RING-TO-SHELL | 101 S R E | HALF GAIN, Q3 ON | MEDIUM, Q4 OFF |
| 430 | HIGH | POWER EYELET-TO-SHELL | 101 S R E | FULL GAIN, Q3 OFF | HIGH, Q4 ON |
| 440 | MEDIUM | POWER EYELET/ RING-TO-SHELL | 101 S R E | MEDIUM GAIN, Q3 ON | HIGH, Q4 ON |

3-WAY, PHASE-CUT DIMMABLE LED DRIVER

BACKGROUND OF THE DISCLOSURE

Three-level switched dimming continues to be popular for incandescent bulbs and associated lamp switches. Three-way incandescent bulbs include two filaments and the corresponding lamp switches provide a switching sequence for off-low-medium-high settings by selectively applying power to one or both of the filaments. For the lowest setting, one filament is powered (e.g., a 50-watt filament). For the next setting, the second filament is powered (e.g., a 100-watt filament), and for the highest light output, both filaments are powered (e.g., for a total of 150 watts in this example). Continuous dimming of incandescent lamps is typically accomplished using triac-equipped wall or table-top dimmer circuits connected in line with the lamp bulb, using so-called "phase cut" dimming where a portion of the line AC waveform is essentially removed in each AC cycle to reduce the light output. Integral electronic lamps such as compact fluorescent designs (CFLs) and LED lamps have recently become more popular in which the lamp includes electronic driver circuitry to generate high frequency AC power to drive a fluorescent light source or DC to drive one or more LEDs. These devices can be used in conventional lamps designed for incandescent bulbs and may include dimming circuitry allowing the light output to be adjusted by phase-cut dimming (triac control), but these phase-cut dimmable electronic lamps cannot be dimmed using a 3-way dimming socket switch.

SUMMARY OF THE DISCLOSURE

The present disclosure provides three-way phase-cut dimmable LED driver circuitry allowing installation into conventional three-way switched lamp sockets or in sockets wired to a wall to table mounted phase-cutting dimmer control. When installed in a three way socket, the circuit senses the position of the three way switch and changes the lamp current accordingly. The lamp can also be dimmed by a table-top dimmer or a wall dimmer (in a three-way socket or in a conventional dual contact socket) by applying a phase-cut power input, with the driver circuit including circuitry to sense the average value of a phase-cut power line to adjust lamp current.

An LED driver is provided, with a rectifier circuit with three AC inputs and a power switch driven by a pulse width modulation (PWM) controller to control application of power to an LED light source. The PWM controller includes an amplifier input, a gain input, and a pulse width modulator with a drive output providing a pulse width modulated control signal to the power switch to set the output power level base at least in part on the amplifier input and the gain input. A sensing circuit is coupled with first and third AC inputs and provides a sensor signal to the PWM controller gain input at a first level if an input voltage is applied to the third AC input terminal and at a lower second level if no input voltage is applied to the third AC input terminal. The driver also includes first and second attenuator circuits to selectively attenuate the voltages at the gain input and the amplifier input, respectively. The first attenuator circuit selectively reduces the voltage at the PWM controller gain input if an input voltage is applied to the second AC input terminal to decrease the output power, and the second attenuator reduces the voltage of the amplifier input if an input voltage is applied to the third AC input terminal to increase the power provided to the at least one LED light source. In this manner, the driver sets the LED power according to the application of input voltage to the three input terminals to accommodate dimming control in a three-way switched lamp socket.

In certain embodiments, the pulse width modulator provides the pulse width modulated control signal to set a dimmable level of output power if a phase-cut signal is applied to the first and second AC input terminals, thus also accommodating external phase-cut dimming control.

In certain embodiments, the sensing circuit includes first and second resistances, with the first resistance coupled between the first AC input terminal and the gain input of the pulse width modulation controller, and the second resistance coupled between the third AC input terminal and the gain input. The sensing circuit in these embodiments provides the sensor signal to the gain input as a half-wave rectified waveform if an input voltage is applied to only one of the second and as a full-wave rectified waveform if an input voltage is applied to both of the second and third AC input terminals.

In certain embodiments, the first attenuator circuit includes a resistance and a switching device, with the resistance having a first terminal coupled with the gain input of the pulse width modulation controller. The first attenuator switching device includes a control input terminal operative according to a voltage applied to the second AC input terminal to selectively couple the second terminal of the attenuator resistance to a circuit ground to reduce a voltage of the gain input if an input voltage is applied to the second AC input terminal.

In certain embodiments, the second attenuator circuit includes a second attenuator resistance and a second attenuator switching device. The second attenuator resistance has a first terminal coupled with the PWM controller amplifier input, and the second attenuator switching device has a control input terminal operative according to a voltage applied to the third AC input terminal to selectively couple the second terminal of the resistance to ground to reduce a voltage of the amplifier input if an input voltage is applied to the third AC input terminal.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Figure 1:
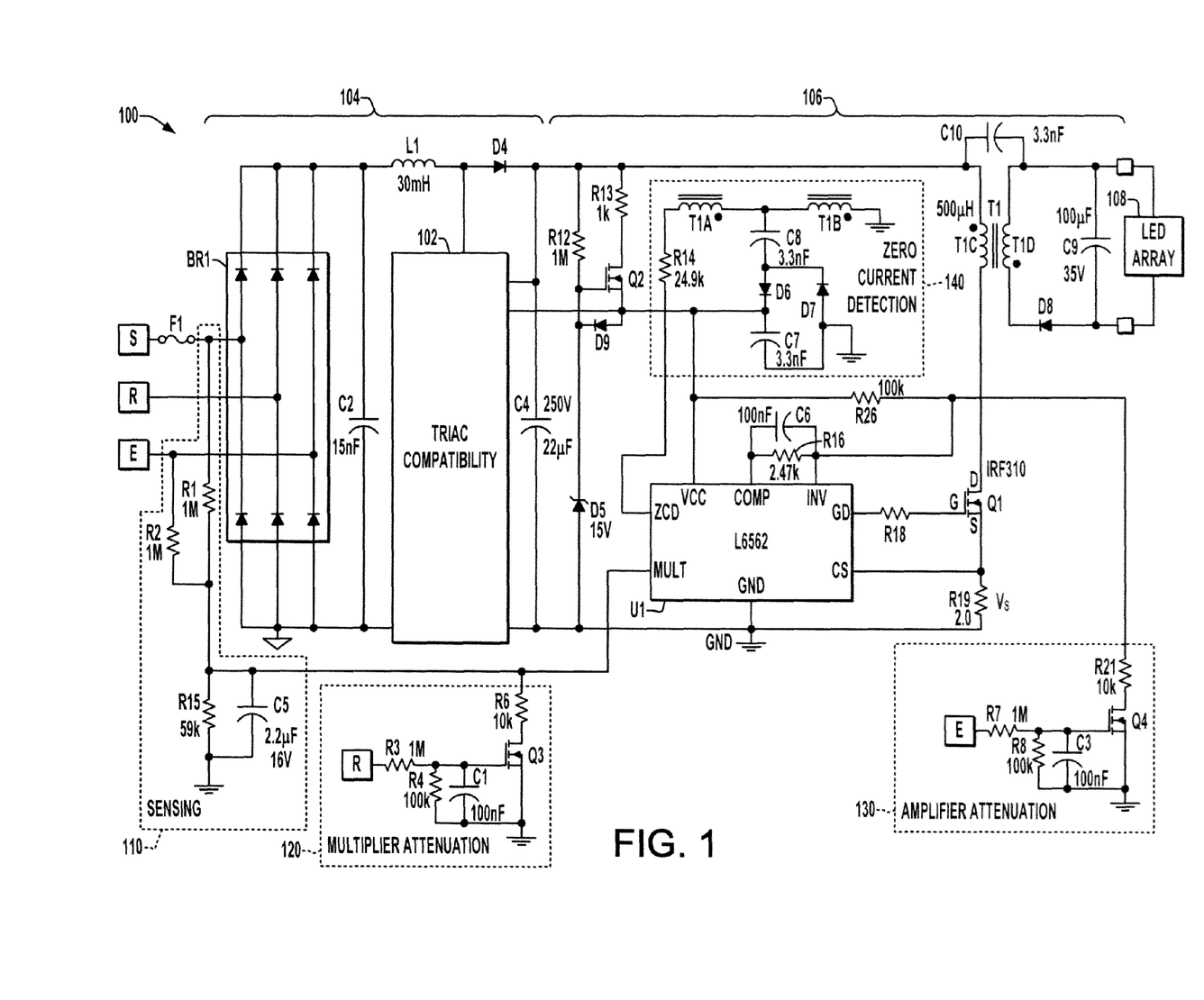
FIG. 1 is a schematic diagram illustrating an exemplary LED driver circuit having three AC input terminals, a sensing circuit and two attenuator circuits for dimming of the LED output power according to power applied by a three-way switched lamp socket or according to phase-cut power applied to two of the inputs.

Referring now to the drawings, like reference numerals are used to refer to like elements throughout and the various features are not necessarily drawn to scale. FIG. 1 illustrates An exemplary LED driver circuit 100 is shown in FIG. 1, which includes a three-terminal AC input stage, a rectifier circuit 104 converting input AC to a DC bus, and a DC-DC converter circuit 106 with a pulse width modulated switch Q1 switching DC bus power via a transformer T1 to drive an LED output. The illustrated circuit 100 includes a flyback type DC-DC converter 106 which converts DC power from the rectifier 104 to drive one or more LED light sources 108, although other forms of pulse width modulation controlled converters 106 can be used.

Figure 2:
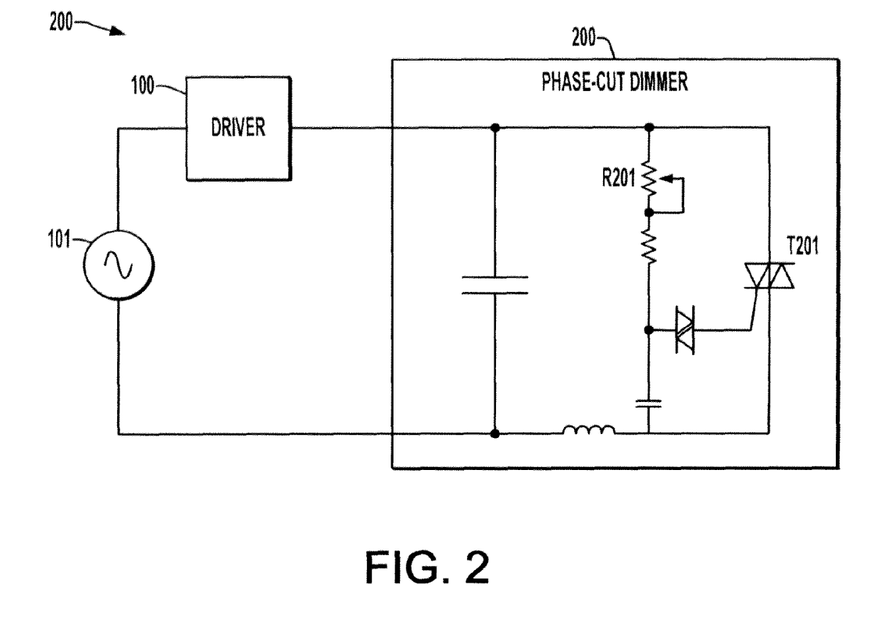
FIG. 2 is a schematic diagram illustrating the LED lamp connected with a phase-cut dimmer for dimming operation.

As shown in FIG. 2, the driver 100 may be powered from a single-phase AC source 101 with dimming control via a phase-cut dimmer 200 coupled in series with the source 101 and the driver 100. In this case, the socket connections to the driver are via two of three input terminals (e.g., a shell terminal "S" and an eyelet terminal "E" indicated in FIG. 1), and the dimmer control 200 selectively cuts or interrupts current flow in portions of each cycle of the AC source 101 using a triac T201 to dim the LED light output according to a user-adjustable resistance R201.

Figure 3:
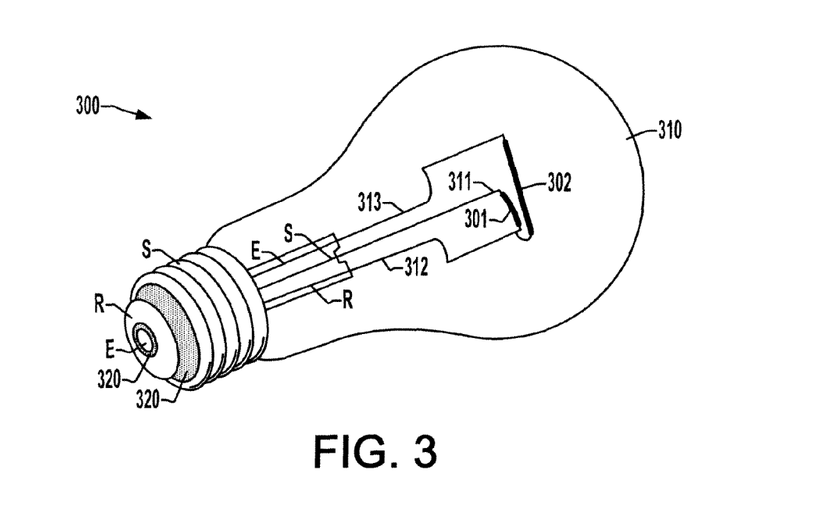
FIG. 3 is a perspective view illustrating a three-way dimmable incandescent bulb showing three AC input terminals on an Edison base.
Figure 4:
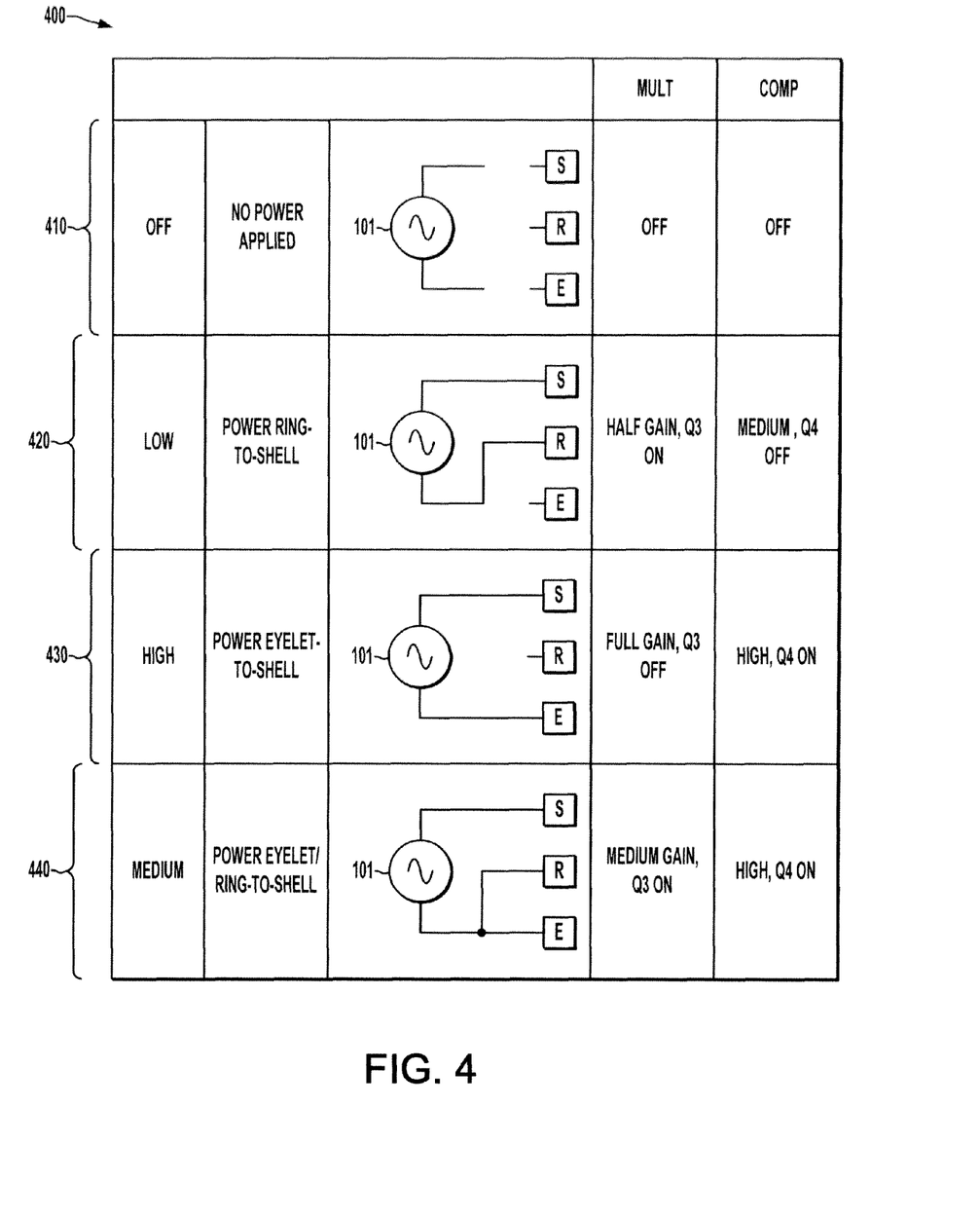
FIG. 4 is a table illustrating operation of the LED driver circuit of FIG. 1 in four switched power conditions of a three-way switched lamp socket.

Referring to FIGS. 3 and 4, FIG. 3 illustrates an exemplary three-way dimmable incandescent bulb 300 with three AC input terminals S, R, and E on an Edison base, which correspond to a shell connection S, a ring connection R, and an eyelet connection E, respectively, with insulation 320 between the contacts. As seen in FIG. 3, the bulb 300 has two filaments 301 and 302 connected with the input terminals via wires 311 (S), 312 (R), and 313 (E). A corresponding lamp socket (not shown) provides a switching sequence for off-low-medium-high settings by selective connection of single-phase AC power connections so as to provide input power to one or both of the filaments. These switched power connections are shown in table 400 of FIG. 4 as settings 410, 420, 430, and 440, respectively. For the low setting 420, the single phase AC source is connected to the shell S and the inner ring R to power the first filament 301. For the medium setting 430, the power is applied to the shell S and the eyelet E to energize the second filament 302, and the highest setting 440 shorts the ring R to the eyelet E and connects one input to the shell S and the other input to the ring R/eyelet E such that both filaments 301 and 302 are powered for maximum light output.

In certain embodiments of the present disclosure, the driver circuitry 100 is housed in a structure having an Edison base with three AC input terminals S, R, and E as shown in FIG. 3, corresponding to the first, second, and third AC input terminals S, R, and E illustrated in FIG. 1, such that the device 100 will operate in the four switch states 410, 420, 430, and 440 shown in the table 400 of FIG. 4, where the table 400 in FIG. 4 shows the switched single-phase power connections provided by a three-way dimming socket. In the illustrated embodiments, moreover, the configuration 430 provides the highest light output and the setting 440 provides a medium light output when the disclosed LED driver 100 is used, whereas these logical positions are reversed when a three-way incandescent bulb (such as that of FIG. 3) is used. Such a three-terminal Edison base implementation can also be used in conjunctions with a phase cut dimmer 200 in the configuration shown in FIG. 2 (in a conventional two-terminal socket or even in a three-terminal switched socket).

Referring again to FIG. 1, as illustrated and described below, the driver 100 provides dimming functionality by either or both of the phase-cut dimmer 200 and/or a three-way switchable socket. The driver 100 receives AC power from a single-phase input source, with the input AC power being applied to two or all of the set of three input terminals S, R, and E, where the applied power may be phase-cut. The circuit 100 includes a six-element rectifier bridge BR1 operative to rectify AC input power applied to two or more of the input terminals S, R, and E to provide a Dc bus voltage across a capacitance C2, with a series inductance L1 and a diode D4 provided in an upper DC bus path after the capacitance C2, and a further capacitor C24 is coupled across the DC bus after the diode D4.

Figure 6:
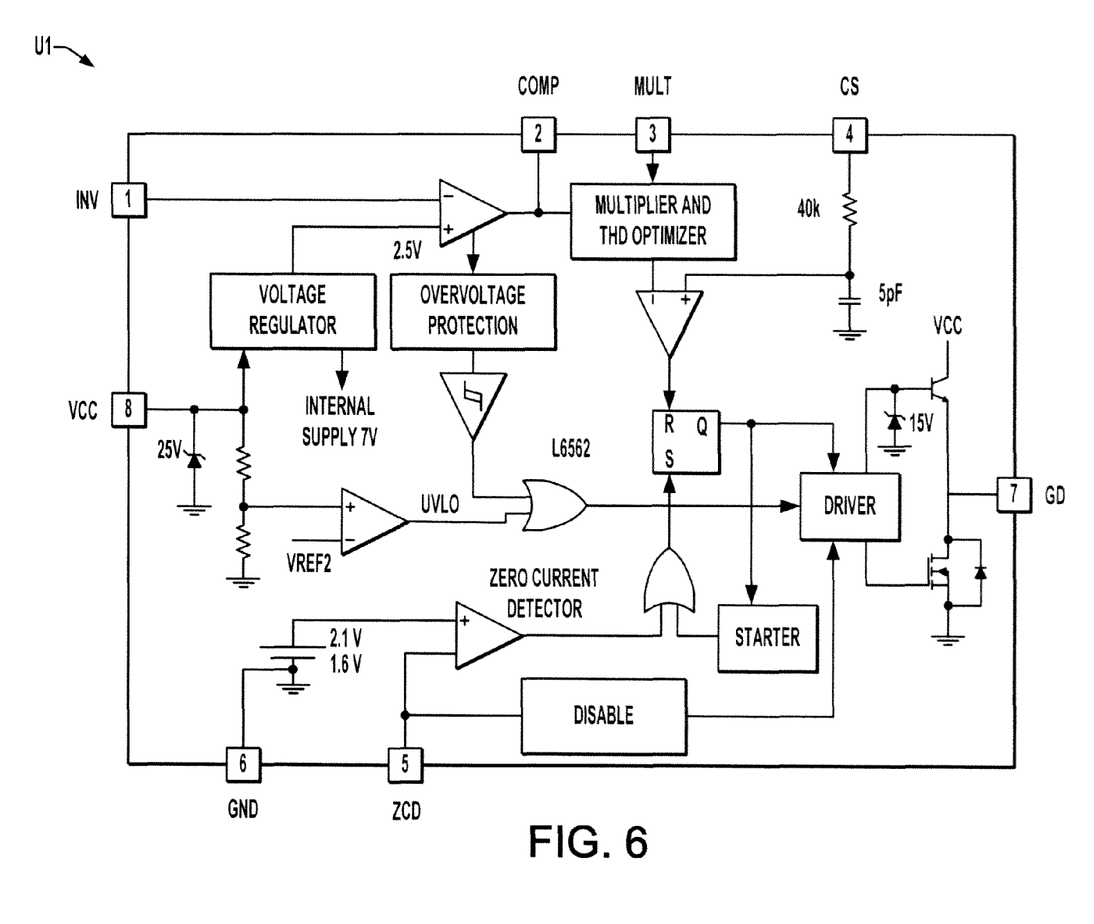
FIG. 6 is a schematic diagram illustrating further details of an exemplary PWM controller in the driver circuit of FIG. 1.

A pulse width modulated power circuit 106 receives the DC bus voltage across C4 and includes a flyback-type DC-DC converter circuit including transformer primary winding TC1 and a power switch (e.g., MOSFET) Q1 to generate a DC output to drive one or more LED light sources 108. Q1 operates according to a pulse width modulated control input signal applied by a PWM controller U1 to a control gate G to control application of DC power to the LED load 108. The controller U1 includes an amplifier input INV coupled with an internal error amplifier, in this case used as a control to selectively set the internal amplifier output at terminal COMP of U1. The controller U1 also includes a gain input MULT and an internal pulse width modulator with a drive output GD providing the PWM control signal to the gate G of Q1 to set the output power level based at least in part on the amplifier input INV (as this affects the amplifier output COMP) and the gain input MULT, where FIG. 6 illustrates internal details of an exemplary transition mode controller U1. A secondary circuit converts current from a secondary winding T1D of the transformer T1 to DC output power to drive the LED load 108. The secondary circuit includes an output capacitor C9 and a rectifier diode D8 positioned such that when current flows in the primary winding T1C (into the 'dot'), the corresponding secondary current (out of the 'dot') in the winding T1D is blocked, causing the flux to build up in the core of the transformer T1, and conversely, the secondary current will flow from the winding T1D to the capacitor C9 and the load 108 (and back into the 'dot' end of winding T1D) once the primary current stops for flyback operation.

The switch Q1 is connected in series between the primary winding T1C and the circuit ground GND along with a series-connected sense resistor R19. As primary current flows through this series circuit, the current through R19 provides a corresponding voltage Vs (relative to the circuit ground GND) across the sense resistor R19 which is used by the controller U1 for both cycle-to-cycle control of the primary current. The PWM controller U1 also includes a comparator input CS coupled with an upper (first) terminal of a sense resistor R19 to receive the sense voltage Vs indicating the primary winding current switched via Q1. The drive output GD provides a pulse width modulated control signal via resistor R18 to the gate of Q1 at least partially according to the amplifier input INV and the gain input MULT.

Referring also to FIG. 6, the PWM controller U1 in certain embodiments is a transition mode power factor correction (PFC) controller such as an L6562 integrated circuit available from Intersil and STMicroelectronics, providing a totem pole output stage for the PWM driver output GD. The device U1 includes an on-board error amplifier with an inverting input INV and an output COMP to allow external connection of a compensation network between the INV and COMP pins. In the present embodiment, resistor R16 and capacitor C6 are connected as shown in FIG. 1 with a resistor R26 connected from the input INV to a circuit supply VDD. The multiplier input MULT is internally connected to a multiplier and THD optimizer circuit in U1 to provide a sinusoidal inverting input to an internal pulse width modulation (PWM) comparator, with a non-inverting PWM comparator input being derived from the input CS (coupled to sense voltage Vs as seen in FIG. 1). Although this is the usual application of the L6562, the disclosed embodiment in FIG. 1 uses the multiplier and the error amplifier as simple gain blocks to change the current sense comparator trigger points, which varies the duty cycle of the gate drive signal GS and thus the level of the primary current. In this regard, the illustrated embodiment does not utilize the filter components C6 and R16 for compensation. Rather, R16 and R21 set the gain according to where in the line voltage is applied in the input bridge rectifier BR1 by operation of the amplifier attenuation circuit 130. The exemplary PWM controller U1, moreover, includes a PWM driver circuit providing the gate drive output GD based on the PWM comparator output, which is selectively enabled and disabled according to a zero-current detect input ZCD, as seen in FIG. 6.

In operation, the current flowing in Q1 is sensed via the resistor R19, and the resulting voltage Vs is applied to the CS pin and compared with an internal sinusoidal-shaped reference, generated by the multiplier, to determine the MOSFET's turn-off. In practice, the gate drive output GD is selectively disabled according to the ZCD input signal status for transition-mode operation, where a negative-going edge triggers the MOSFET's turn-on. This advantageously allows connection to an optional zero current detection circuit 140 such that the switch Q1 will turn on when the current through the primary winding T1C is zero. The ground pin GND provides a current return path for both the signal part and the gate driver circuitry of U1.

As shown in FIG. 1, moreover, the circuit 100 in certain embodiments may also include a zero crossing detection circuit 140 coupled with the transition mode PWM controller U1. The zero crossing detection circuit 140 includes sense windings T1A and T1B which are wound on the core of transformer T1 and are thus magnetically coupled with the primary winding T1C, and the circuit further includes a center node connecting T1A and T1B with capacitor C8. The lower terminal of C8 is coupled to VCC through diode D6 and to ground through diode D7, and a bypass capacitor C7 is connected from VCC to ground GND. The zero crossing circuit 130 senses a zero crossing condition of the primary winding T1C using the sense windings T1A and T1B and selectively provides a signal to the zero crossing detect input ZCD of the PWM controller U1 via resistor R14 indicating a sensed zero crossing condition of the primary winding T1C.

As seen in FIG. 1, moreover, the illustrated embodiment also includes a capacitance C10 coupled across the upper legs of the primary and secondary windings T1C and T1D. In addition, the circuit 100 may include a triac compatibility circuit 102 to provide an impedance for electronic type external phase-cut dimmers 200. The illustrated circuit also includes a circuit at the input of the DC-DC converter stage 106 including a MOSFET Q2 coupled between the upper DC bus line and VDD via resistor R13, with a gate coupled to the upper DC bus by resistor R12 and to the circuit ground GND via a 15V zener diode D5.

A sensing circuit 110 (FIG. 1) is coupled with the input terminals S and E and provides a sensor signal to the gain input MULT of U1. The MULT input is also selectively attenuated by a multiplier attenuator circuit 120, where the combined effect of these circuits is seen in the table 400 of FIG. 4 and in the V MULT curve 504 in the graph 500 of FIG. 5. In operation when the circuit 100 is installed in a three-way switched dimming socket, the sensor signal is provided to the gain input MULT at a first level if an input voltage is applied to the input terminal E (e.g., settings 430 and 440 in FIGS. 4 and 5) and is otherwise provided at a lower second level if no input voltage is applied to terminal E (e.g., settings 410 and 420). The sensing circuit 110 in the illustrated embodiment generates the sensor signal via a resistor R1 coupled between the first AC input terminal S and the gain input MULT and a second resistor R2 coupled between input terminal E and the gain input MULT, with the resistors R1 and R2 forming a voltage divider with a resistor R15 coupled from the MULT terminal to ground GND, and a filter capacitor C5 connected in parallel across R15. In this manner, the sensing circuit 110 provides the sensor signal to the gain input MULT as a half-wave rectified waveform if the input voltage is connected to only one of the terminals R or E and the sensor signal is a full-wave rectified waveform (of higher amplitude) if an input voltage is applied to both terminals R and E.

The multiplier (first) attenuator circuit 120 has an input coupled with the input terminal R and an output coupled with the gain input MULT. The attenuator 120 selectively reduces (attenuates) the gain input voltage at the MULT terminal if an input voltage is applied to the input terminal R, thereby decreasing the PWM duty cycle and thus the LED output power. In the embodiment of FIG. 1, the first attenuator circuit 120 includes a resistor R6 coupled between the gain input MULT and an attenuator switch Q3 with Q3 having a control gate operative according to the voltage applied to the input terminal R to selectively ground the lower terminal of R6. The illustrated circuit 120 includes a resistive divider formed by resistors R3 and R4 to scale the signal from the R terminal, as well as a filter capacitor C1 coupled from the gate of Q3 to ground. In operation, when an input voltage is applied to the AC input terminal R (e.g., the low and medium switch settings 420 and 440 in FIGS. 4 and 5), the first attenuator circuit 120 reduces the voltage of the gain input MULT by coupling the lower terminal of R6 to GND, where this attenuation is combined with the sensing signal provided by the sensing circuit 110 to set the gain input provided to the PWM controller U1.

The driver 100 of FIG. 1 also includes a second (amplifier) attenuator circuit 130 with a resistor R21 coupled between the amplifier inverting input INV and a second attenuator switch Q4, with the source of Q4 grounded. The gate of Q4 is coupled with the third AC input terminal E via a divider formed by resistors R7 and R8 and a filter capacitor C3, and Q4 is operated if a voltage is applied to the terminal E (e.g., the high and medium settings 430 and 440 in FIGS. 4 and 5) to selectively ground the lower terminal of R21. With R21 grounded, the voltage at the amplifier input INV remains constant and current flows into R21. This current is approximately equal to the internal reference voltage divided by the value of R21. The internal reference voltage is about 2.5 Volts for the illustrated L6562 controller. The flow of current through R21 causes more current to flow through R16, thus raising the output voltage of the internal error amplifier, observable at the COMP pin. A higher amplifier output voltage of the internal error amplifier of U1 increase the threshold level of the internal current sense comparator, increasing the pulse width modulated drive signal duty cycle and thus allowing more current to flow into the LED array 108. Thus, the voltage at the COMP pin of U1 changes depending on whether R21 is grounded (e.g., whether Q4 is on or off), which in turn is determined by whether or not power is applied to the eyelet input E. In this embodiment, therefore, when power is applied to the E input terminal (high and medium settings 430 and 440 in FIGS. 4 and 5), the COMP terminal of U1 (driven by the internal error amplifier output) is at its maximum value, and when no power is applied to the E terminal (low setting 420), the COMP output is at a level just below the 2.5 volt internal reference due to R26.

Figure 5:
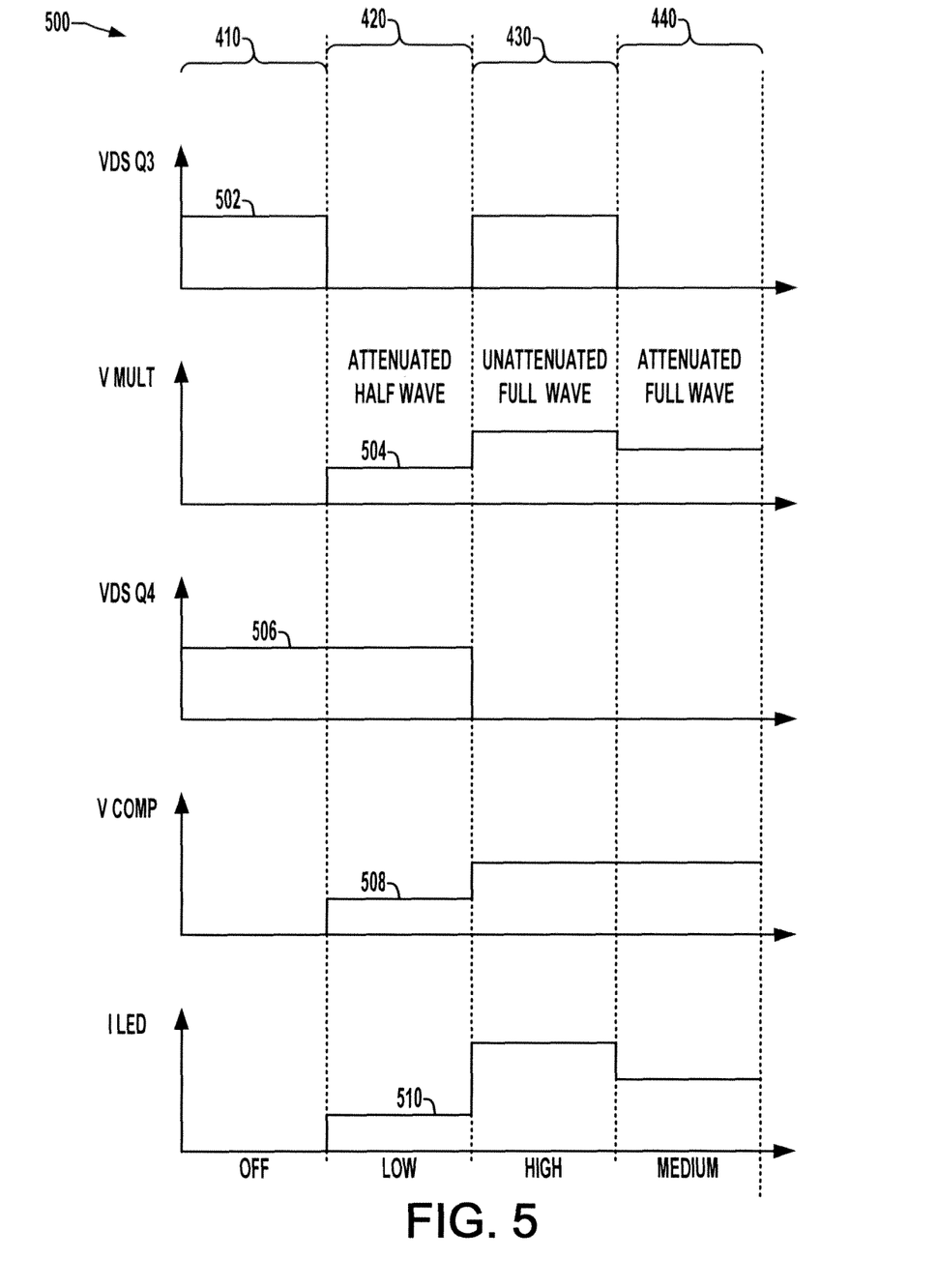
FIG. 5 is a graph showing waveform diagrams of voltages and currents in the driver circuit of FIG. 1 in four switched power conditions of the three-way switched lamp socket.

Referring to FIGS. 4 and 5, the table 400 in FIG. 4 shows operation of the circuit 110 in association with a 3-way switched dimming socket having four switching states 410, 420, 430, and 440. As discussed above, these switch states generally correspond to an off-low-medium-high switch sequence for dimming an ordinary dimmable incandescent bulb of the type shown in FIG. 3. For the dimmable LED driver 100, in contrast, the third state 430 provides maximum light output and the fourth state 440 provides a medium light output setting. In each of the three powered states 420, 430, and 440, moreover, the light output can be further modified by phase-cut dimming. In operation, the gain input MULT and the amplifier input INV of the PWM controller U1 are modified by operation of the sense circuit 110 and the two attenuator circuits 120 and 130 (with the INV attenuation affecting the COMP voltage as described above) according to the connection of the AC input to certain of the input terminals S, R, E.

Regarding the sense circuit 110 and the multiplier attenuator 120, FIG. 5 shows voltage waveforms for the driver 100, including the drain-source voltage 502 (VDS Q3) across the first attenuator switch Q3, and the voltage 504 (VMULT) at the gain input MULT of the PWM controller. FIG. 5 further shows waveforms associated with operation of the amplifier attenuator 130, including the drain-source voltage 506 (VDS Q4) across the second attenuator switch Q4 and the voltage 508 (V COMP) at the amplifier output, as well as the LED output current 510 (I LED).

In the first powered setting 420 (for low LED light output), the single-phase AC input voltage is applied across the shell S and ring R terminals, and the nominal sensing circuit output signal is essentially at half gain in certain embodiments based on a half-wave rectified voltage (no voltage is applied to the E terminal in this case), with the multiplier attenuator 120 being activated by the application of power to the R terminal. This first attenuator activation turns Q3 on, thereby reducing (attenuating) the sense signal from the circuit 110, with the gain input 504 (V MULT) being at a first level (attenuated half-wave) as shown in FIG. 5. Also at the low setting 420, the amplifier attenuator circuit 130 is inactive (Q4 off) since no voltage is applied to the E terminal, and the output 508 of the PWM controller error amplifier is just below the internal reference voltage level because of resistor R26. Consequently, the LED output current 510 is at a low level at the low socket switch setting 420.

In the high setting 430, the eyelet and shell terminals E and S are coupled to the AC input. Since the sense circuit 110 is coupled to both these terminals, the nominal sensor output signal is at full gain based on a full-wave rectified voltage. Moreover, since the ring terminal R is not powered, the multiplier attenuator circuit 120 is inactive (Q3 off), whereby the unattenuated full wave sensor signal 504 is provided at the PWM controller gain input MULT. In addition, the amplifier attenuator circuit 130 is active, with Q4 being switched on by application of power to the E terminal. This grounds resistor R21 to cause the COMP signal 508 to rise, thus increasing the driver output power delivered to the LED(s) 108. The composite effect of the circuits 110, 120, and 130 in this case results in maximum power being provided to the load 108 for the highest light output setting.

In the medium setting 440. the eyelet and shell terminals E and S are again coupled to the AC input and the nominal sensor output signal is at full gain based on a full-wave rectified voltage. However, since the power is also applied to the ring terminal R, the multiplier attenuator circuit 120 is activated, causing Q3 to turn on and thus attenuate the gain input signal 504 to an attenuated full wave level as seen in FIG. 5. In this situation, moreover, the amplifier attenuator 130 is also on, with Q4 grounding R21 to cause the COMP voltage 508 to remain at the same high level as in setting 430. The combined effects of the circuits 110, 120, and 130 in the medium setting 440 thus provides an intermediate output power being delivered by the secondary circuit and the LED(s) 108 provides an intermediate (medium) lumen output.

Moreover, in operation with the device 100 installed in a socket coupled to a wall or table mounted dimmer 200 (FIG. 2), the PWM drive signal GD responds to changes in the AC input waveform resulting from phase-cutting by operation of the sensing circuit 110 (whether the AC input power is applied to one or both of the ring and/or eyelet terminals (R, E) in providing the sensor signal to the gain input MULT. Thus, the PWM duty cycle is modified according to the amount of phase-cutting. As a result, with or without switch settings of a switched socket, the pulse width modulator provides the PWM control signal to set the dimmable level of output power based on application of a phase-cut signal to the driver 100.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. Although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

The invention claimed is:

1. An LED driver, comprising:
  a rectifier circuit with an AC input having first, second, and third AC input terminals
  a pulse width modulated power circuit providing a DC output to drive at least one LED light source, the power circuit comprising:
    a first switching device comprising a control input terminal and operative according to a pulse width modulated control input signal to control application of power to the at least one LED light source,
    a pulse width modulation controller, including an amplifier input, a gain input, and a pulse width modulator with a drive output providing the pulse width modulated control signal to the control input terminal of the switching device to set a level of output power provided to the at least one LED light source at least partially according to the amplifier input and the gain input;

a sensing circuit coupled with the first and third AC input terminals and providing a sensor signal to the gain input of the pulse width modulation controller, the sensing circuit providing the sensor signal at a first level if an input voltage is applied to the third AC input terminal and providing the sensor signal at a lower second level if no input voltage is applied to the third AC input terminal;

a first attenuator circuit comprising a first attenuator input coupled with the second AC input terminal and a first attenuator output coupled with the gain input of the pulse width modulation controller, the first attenuator circuit operative to selectively reduce a voltage of the gain input if an input voltage is applied to the second AC input terminal to decrease the power provided to the at least one LED light source; and a second attenuator circuit comprising a second attenuator input coupled with the third AC input terminal and a second attenuator output coupled with the amplifier input of the pulse width modulation controller, the second attenuator circuit operative to selectively reduce a voltage of the amplifier input if an input voltage is applied to the third AC input terminal to increase the power provided to the at least one LED light source.

2. The LED driver or claim 1, where the sensing circuit comprises:
a first resistance coupled between the first AC input terminal and the gain input of the pulse width modulation controller; and
a second resistance coupled between the third AC input terminal and the gain input;
the sensing circuit providing the sensor signal to the gain input as a half-wave rectified waveform if an input voltage is applied to only one of the second and third AC input terminals and providing the sensor signal as a full-wave rectified waveform if an input voltage is applied to both of the second and third AC input terminals.

3. The LED driver of claim 2, where the pulse width modulator provides the pulse width modulated control signal to set a dimmable level of output power if a phase-cut signal is applied to the first and third AC input terminals.

4. The LED driver of claim 3, where the pulse width modulator provides the pulse width modulated control signal to set a dimmable level of output power if a phase-cut signal is applied to the first and second AC input terminals.

5. The LED driver of claim 4, where the first attenuator circuit comprises:
a first attenuator resistance with a first terminal coupled with the gain input of the pulse width modulation controller, and a second terminal; and
a first attenuator switching device having a control input terminal operative according to a voltage applied to the second AC input terminal to selectively couple the second terminal of the first attenuator resistance to a circuit ground to reduce a voltage of the gain input if an input voltage is applied to the second AC input terminal.

6. The LED driver of claim 5, where the second attenuator circuit comprises:
a second attenuator resistance with a first terminal coupled with the amplifier input of the pulse width modulation controller, and a second terminal; and
a second attenuator switching device having a control input terminal operative according to a voltage applied to the third AC input terminal to selectively couple the second terminal of the second attenuator resistance to a circuit ground to reduce a voltage of the amplifier input if an input voltage is applied to the third AC input terminal.

7. The LED driver of claim 4, where the second attenuator circuit comprises:
a second attenuator resistance with a first terminal coupled with the amplifier input of the pulse width modulation controller, and a second terminal; and
a second attenuator switching device having a control input terminal operative according to a voltage applied to the third AC input terminal to selectively couple the second terminal of the second attenuator resistance to a circuit ground to reduce a voltage of the amplifier input if an input voltage is applied to the third AC input terminal.

8. The LED driver of claim 3, where the first attenuator circuit comprises:
a first attenuator resistance with a first terminal coupled with the gain input of the pulse width modulation controller, and a second terminal; and
a first attenuator switching device having a control input terminal operative according to a voltage applied to the second AC input terminal to selectively couple the second terminal of the first attenuator resistance to a circuit ground to reduce a voltage of the gain input if an input voltage is applied to the second AC input terminal.

9. The LED driver of claim 8, where the second attenuator circuit comprises:
a second attenuator resistance with a first terminal coupled with the amplifier input of the pulse width modulation controller, and a second terminal; and
a second attenuator switching device having a control input terminal operative according to a voltage applied to the third AC input terminal to selectively couple the second terminal of the second attenuator resistance to a circuit ground to reduce a voltage of the amplifier input if an input voltage is applied to the third AC input terminal.

10. The LED driver of claim 3, where the second attenuator circuit comprises:
a second attenuator resistance with a first terminal coupled with the amplifier input of the pulse width modulation controller, and a second terminal; and
a second attenuator switching device having a control input terminal operative according to a voltage applied to the third AC input terminal to selectively couple the second terminal of the second attenuator resistance to a circuit ground to reduce a voltage of the amplifier input if an input voltage is applied to the third AC input terminal.

11. The LED driver of claim 2, where the pulse width modulator provides the pulse width modulated control signal to set a dimmable level of output power if a phase-cut signal is applied to the first and second AC input terminals.

12. The LED driver of claim 2, where the first attenuator circuit comprises:
a first attenuator resistance with a first terminal coupled with the gain input of the pulse width modulation controller, and a second terminal; and
a first attenuator switching device having a control input terminal operative according to a voltage applied to the second AC input terminal to selectively couple the second terminal of the first attenuator resistance to a circuit ground to reduce a voltage of the gain input if an input voltage is applied to the second AC input terminal.

13. The LED driver of claim 12, where the second attenuator circuit comprises:
a second attenuator resistance with a first terminal coupled with the amplifier input of the pulse width modulation controller, and a second terminal; and a second attenuator switching device having a control input terminal operative according to a voltage applied to the third AC input terminal to selectively couple the second terminal of the second attenuator resistance to a circuit ground to reduce a voltage of the amplifier input if an input voltage is applied to the third AC input terminal.

14. The LED driver of claim 2, where the second attenuator circuit comprises:
   a second attenuator resistance with a first terminal coupled with the amplifier input of the pulse width modulation controller, and a second terminal; and
   a second attenuator switching device having a control input terminal operative according to a voltage applied to the third AC input terminal to selectively couple the second terminal of the second attenuator resistance to a circuit ground to reduce a voltage of the amplifier input if an input voltage is applied to the third AC input terminal.

15. The LED driver of claim 1, where the pulse width modulator provides the pulse width modulated control signal to set a dimmable level of output power if a phase-cut signal is applied to the first and second AC input terminals.

16. The LED driver of claim 15, where the first attenuator circuit comprises:
   a first attenuator resistance with a first terminal coupled with the gain input of the pulse width modulation controller, and a second terminal: and
   a first attenuator switching device having a control input terminal operative according to a voltage applied to the second AC input terminal to selectively couple the second terminal of the first attenuator resistance to a circuit ground to reduce a voltage of the gain input if an input voltage is applied to the second AC input terminal.

17. The LED driver of claim 16, where the second attenuator circuit comprises:
   a second attenuator resistance with a first terminal coupled with the amplifier input of the pulse width modulation controller, and a second terminal; and
   a second attenuator switching device having a control input terminal operative according to a voltage applied to the third AC input terminal to selectively couple the second terminal of the second attenuator resistance to a circuit ground to reduce a voltage of the amplifier input if an input voltage is applied to the third AC input terminal.

18. The LED driver of claim 15, where the second attenuator circuit comprises:
   a second attenuator resistance with a first terminal coupled with the amplifier input of the pulse width modulation controller, and a second terminal; and
   a second attenuator switching device having a control input terminal operative according to a voltage applied to the third AC input terminal to selectively couple the second terminal of the second attenuator resistance to a circuit ground to reduce a voltage of the amplifier input if an input voltage is applied to the third AC input terminal.

19. The LED driver of claim 1, where the first attenuator circuit comprises:
   a first attenuator resistance with a first terminal coupled with the gain input of the pulse width modulation controller, and a second terminal; and
   a first attenuator switching device having a control input terminal operative according to a voltage applied to the second AC input terminal to selectively couple the second terminal of the first attenuator resistance to a circuit ground to reduce a voltage of the gain input if an input voltage is applied to the second AC input terminal.

20. The LED driver of claim 19, where the second attenuator circuit comprises:
   a second attenuator resistance with a first terminal coupled with the amplifier input of the pulse width modulation controller, and a second terminal; and
   a second attenuator switching device having a control input terminal operative according to a voltage applied to the third AC input terminal to selectively couple the second terminal of the second attenuator resistance to a circuit ground to reduce a voltage of the amplifier input if an input voltage is applied to the third AC input terminal.

21. The LED driver of claim 1, where the second attenuator circuit comprises:
   a second attenuator resistance with a first terminal coupled with the amplifier input of the pulse width modulation controller, and a second terminal; and
   a second attenuator switching device having a control input terminal operative according to a voltage applied to the third AC input terminal to selectively couple the second terminal of the second attenuator resistance to a circuit ground to reduce a voltage of the amplifier input if an input voltage is applied to the third AC input terminal.

* * * * *